United States Patent [19]

Kimbara et al.

[11] 3,945,351
[45] Mar. 23, 1976

[54] COMBUSTION CHAMBER OF A DIRECT FUEL INJECTION TYPE DIESEL ENGINE

[75] Inventors: Motoyasu Kimbara, Yokohama; Hiroshi Shimomukai, Fujisawa, both of Japan

[73] Assignee: Isuzu Motors Limited, Tokyo, Japan

[22] Filed: July 19, 1974

[21] Appl. No.: 489,975

[52] U.S. Cl. ......... 123/32 B; 123/193 P; 123/32 ST
[51] Int. Cl.² .............................. F02B 23/06
[58] Field of Search .......... 123/30 D, 32 ST, 32 SA, 123/32 SP, 191 S, 191 SP, 75 B, 193 CP, 193 P, 32 B, 37

[56] References Cited
UNITED STATES PATENTS

| | | | |
|---|---|---|---|
| 2,828,724 | 4/1958 | Schneider | 123/32 B |
| 2,855,906 | 10/1958 | Galli | 123/32 B |
| 2,975,773 | 3/1961 | Meurer | 123/30 D |
| 3,020,898 | 2/1962 | Hartmann | 123/32 B |
| 3,302,627 | 2/1967 | Morris | 123/30 B |
| 3,374,773 | 3/1968 | Scherenberg | 123/30 D |

FOREIGN PATENTS OR APPLICATIONS

| | | | |
|---|---|---|---|
| 580,163 | 8/1958 | Italy | 123/32 B |
| 86,241 | 9/1958 | Denmark | 123/30 D |

*Primary Examiner*—Charles J. Myhre
*Assistant Examiner*—William C. Anderson
*Attorney, Agent, or Firm*—Sughrue, Rothwell, Mion, Zinn & Macpeak

[57] ABSTRACT

A combustion chamber of a direct fuel injection type diesel engine has a cavity at the crown of a piston, within which a swirl occurs and onto which fuel is injected from a multi-orifice fuel injection nozzle toward a inner side wall of the cavity. The cavity is regular polygonal in horizontal cross-section. The inner side wall is so inclined inwardly of the cavity as to provide a restriction at the opening of the cavity. The inner side wall and the injection nozzle are so arranged that the fuel jet is distributed to the downstream side of the swirl after being impinged the inner side wall, whereby the distribution of the injected fuel is improved to provide ideal mixture in the cavity, resulting in reduced amount of pollutant emissions.

2 Claims, 9 Drawing Figures

FIG.1a PRIOR ART
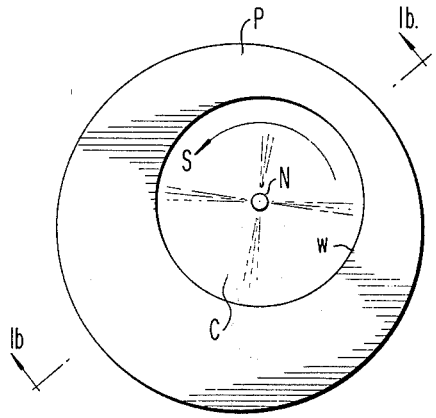
FIG.1b PRIOR ART
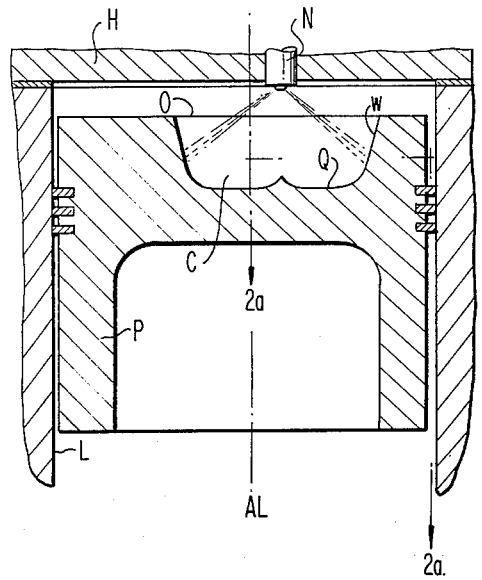
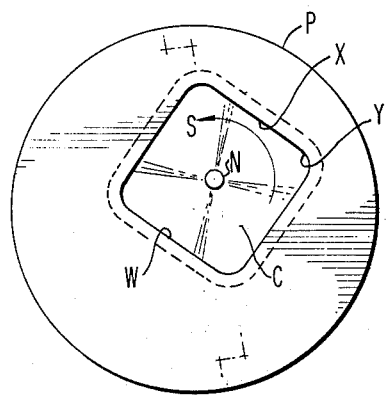
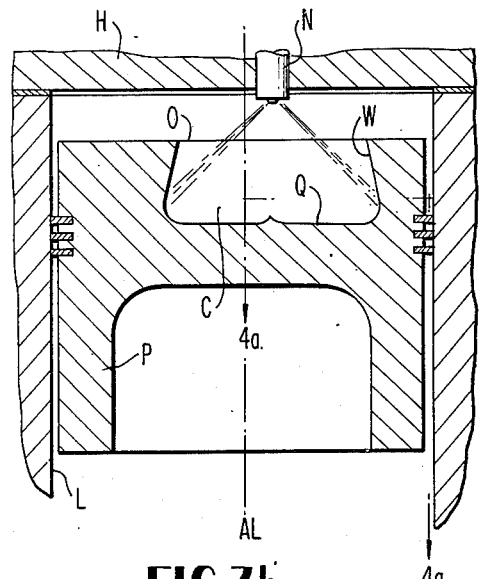
FIG.3a  FIG.3b

COMBUSTION CHAMBER OF A DIRECT FUEL INJECTION TYPE DIESEL ENGINE

BACKGROUND OF THE INVENTION

1. Field of the Invention

The present invention relates to diesel engines of the direct fuel injection type, and more particularly to a combustion construction chamber for such diesel engines.

2. Description of the Prior Art

In conventional diesel engine of the direct fuel injection type, a cavity C having circular shape in cross-section and is formed in the crown of the piston P, and fuel jets are injected toward the preipheral wall w of the cavity C from a multi-orifice fuel injection nozzle N which itself is directed toward the center of the cavity C, as shown in FIGS. 1 and 2.

The the fuel jets impinge the circular peripheral wall w and are distributed in such a manner as illustrated in FIG. 2a by a swirl S which is generated in the cavity in a known manner.

In general, the fuel mixture $f_1$ distributed at the downstream portion of the swirl S constitutes a lean mixture which is likely to increase unfavorable HC emission due to its poor combustibility. The fuel mixture $f_2$ is an ideal mixture which presents a good combustion. The fuel mixture $f_3$ is a too rich a mixture with insufficient air, and leads to emission of CO and smoke.

The above described distribution of injected fuel forming lean mixture $f_1$, ideal mixture $f_2$ and rich mixture $f_3$ is also observed in vertical planes, as seen from FIG. 2b, which would necessarily lead to emission of HC, CO and smoke.

And also mixture flows out from the opening O of the cavity C into space which surrounded by cylinder head H, cylinder liner L and piston P by inverse squish IS which appears after the piston has passed the top dead center. Since the cylinder liner L and cylinder head H are usually cooled by cooling water or the like, the portion of the fuel which is biased to the space is cooled upon contacting those members and turns incombustible whereby the emission of smoke is considerably increased.

SUMMARY OF THE INVENTION

It is therefore an object of the invention to overcome above described shortcomings by providing an improved combustion chamber which is capable of preventing formation of pollutant substances during combustion and thereby reducing the amount of pollutant emissions.

The combustion chamber presented by the present invention is characterized in that the cavity formed at the crown of the piston is polygonal in cross-section (corresponding to circular in cross-section described in above). The arrangement is such that the fuel jets impinge the inner side wall W (corres. to the peripheral wall w in above description) and is then distributed to the downstream side of the swirl S. The inner side wall W of the cavity is inclined upwardly and inwardly thereby forming a restricted opening of the cavity.

Other objects, features and advantages of the present invention will be apparent from the following description taken in ccnjunction with the accompanying drawings, in which:

BRIEF DESCRIPTION OF THE DRAWINGS

FIG. 1a is a plan view of a conventional combustion chamber having a cavity of circular in cross-section formed in the crown of the piston.

FIG. 1b is a vertical cross-sectional view taken along the line 1b—1b of FIG. 1a.

FIG. 3a is a plan view of a combustion chamber embodying the present invention.

FIG. 3b is a vertical sectional view taken along the line 3b—3b of FIG. 3a.

DETAILED DESCRIPTION OF THE PREFERRED EMBODIMENT

The present invention will now be described with reference to FIGS. 3a and 3b. As shown, a combustion chamber formed by a cylinder head H, cylinder liner L and piston P having a cavity C in its crown portion. The cavity C is defined by a bottom Q and a inner side wall W (peripheral wall) comprising a number of substantially flat wall portions X and circular wall portions Y. Thus the cavity C is polygonal shape in perpendicular section of the axis line AL of the piston P. Although the polygonal shape is shown as being rectangular, this is not exclusive and the other polygonal shapes such as pentagon or hexagon may fairly be employed.

The inner side wall W (flat walls X and circular walls Y) is so inclined that they may form an angle $\alpha$ with a line NL which is parallel to said axis line AL of the piston P. In other words, the inner side wall W is inclined upwardly and inwardly of the cavity C thereby forming a restricted opening O of the piston. A fuel injection nozzle N has a numbers of orifices corresponding to the number of circular wall portions Y or flat wall portions X, and fuel jet are injected into the cavity C toward the inner side wall W thereof from the nozzle N directed towards the center of the cavity C.

Figure 2A:
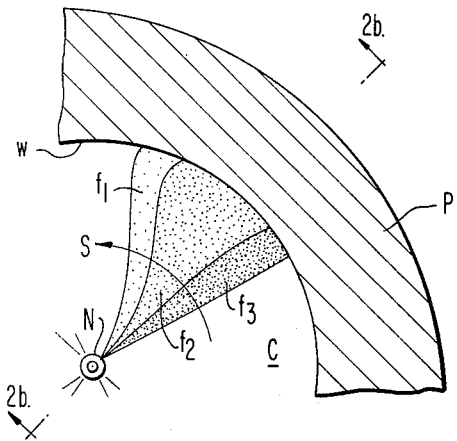
FIG. 2a is a partial enlarged sectional view taken along the line 2a—2a of FIG. 1b.
Figure 2B:
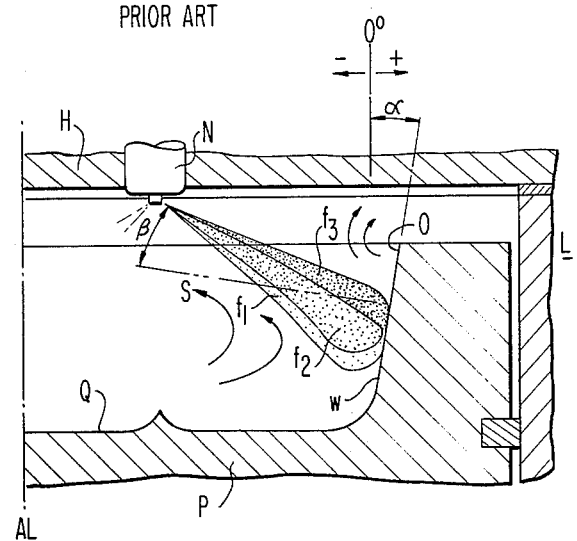
FIG. 2b is a vertical sectional view taken along the line 2b—2b of FIG. 2a. Both of FIGS. 2a and 2b are explanatory of the distribution of the injected fuel in conventional combustion chamber.
Figure 4A:
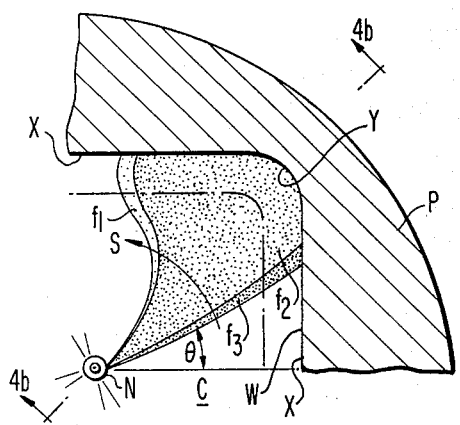
FIG. 4a is a partial enlarged sectional view taken along the line 4a—4a of the FIG. 3b.

A swirl S is generated in the cavity C by the known manner. Supposing that the fuel is injected from the nozzle N toward the inner side wall W at angle $\theta$ before the piston P reches the top dead center (T.D.C.), the fuel jets impinge the inner side wall (mainly flat wall) and then push away to the down stream side of the swirl S. This manner of fuel distribution is substantially improved as compared with the distribution in a conventional chamber. Namely, as seen from FIG. 4a, lean mixture $f_1$ and rich mixture $f_3$ are comparatively decreased while the rate of the ideal mixture $f_2$ to the whole injected fuel is appreciably increased, thereby presenting good combustion with minimized resultant emission of CO, HC and smoke.

Figure 4B:
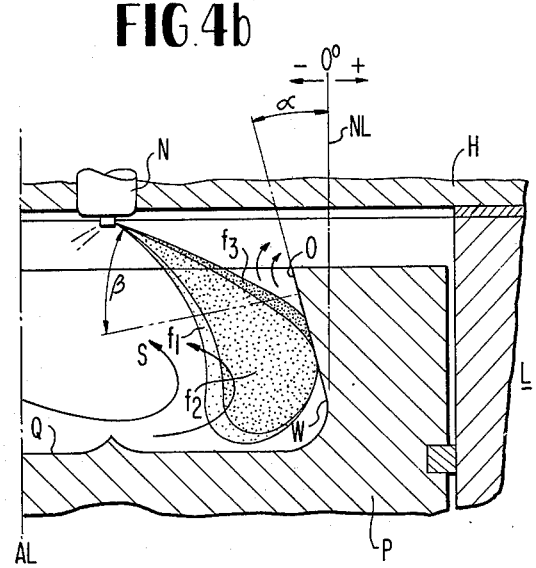
FIG. 4b is a sectional view taken along the line 4a—4a of FIG. 4a. Both of FIGS. 4a and 4b are for explaining the manner of fuel distribution in the combustion chamber as shown in FIGS. 3a and 3b.

Turning now to the vertical distribution of the fuel jets as shown in FIG. 4b, there are mixtures $f_1, f_2$ and $f_3$ described above and the proportion of the ideal mixture $f_2$ to the whole distribution is also increased. Namely, owing to the inclination of the inner side wall W, the jets impinging angle $\beta$ which is formed between the fuel jets and a line at right angle to the inclined inner side wall W (the line indicated by two dotted chain line in FIG. 4b) is increased so that the distribution toward the bottom Q of the cavity is enhanced, whereby the ideal mixture $f_2$ is comparatively increased. This of course leads to a further minimizing of the pollutant substances.

And further, a tendency of the flow out of the mixture by inverse sqiush IS is restrained because of the restriction at the opening O of the cavity C. This conveniently prevents the fuel from contacting the cooled cylinder liner L or cylinder head H. It can be kept the emission of HC and smoke at a minimum.

In addition, the burned gases which have become lighter in specific gravity concentrate in the vicinity or around the center of the cavity C, by means of centrifugal separating action of swirl S, whereas the fresh air (nothing to do with burning) runs along the inner side wall W being ruled by the restriction at the opening O of the cavity C, partly because of the inclination of the inner side wall W. It is advantageous that the fresh air running along the inner side wall W can conveniently be mixed with the fuel which is injected toward the inner side wall W and atomized on the inner side wall W.

Figure 5:
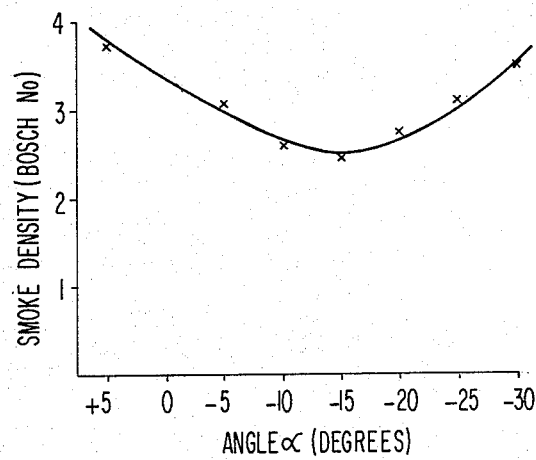
FIG. 5 is a graph showing an exemplary and experimental relationship between the smoke density and the angle $\alpha$ by which the inner side wall of the cavity is inclined inwardly.

The inventors have carried out a series of tests to seek the optimum value of the angle $\alpha$ for obtaining the above described effects, and obtained conclusions as shown in the diagram of FIG. 5.

FIG. 5 shows that the smoke density cannot be reduced satisfactorily when the angle $\alpha$ is below 3°. This means that the restricting effect caused by the inclination of the inner side wall W at the opening O of the cavity C is insufficient. At the same time, it is observed that the angle $\alpha$ greater than 25° cannot provide sufficient reduction of the smoke dencity. Presumably, this is attributed to an excess restriction at the opening of the cavity, which considerably increases the resistance of flow of fresh air entering the cavity and of burned gases getting out of the cavity. It is clear that the increased resistance leads to loss of energy and deterioration in the distribution of atomized fuel. As the result of the test it is evident that the angle $\alpha$ of the inclination of the inner side wall W inwardly and upwardly must be somewhere in the region between 3° and 25°. It has also provide through the test that the aforementioned angle $\theta$ is preferably within the range of 20° to 40°, when the cavity is of rectangular in cross section as the described embodiment.

It is to be noted, although the flat wall portions X have been referred as being "flat", that the surfaces of the walls need not be strictly or accurately flat, and any walls having a portion materially or substantially flat can do as the "flat" walls X.

While the invention has been described on a preferred embodiment, it is to be understood that the invention is not limited to the described particular form but may be otherwise variously embodied within the scope of the following claim.

What is claimed is:

1. In a combustion chamber of a direct fuel injection type diesel engine, wherein a cavity is formed at the crown of a piston, means are provided for generating a fuel mixture swirl in the cavity, and a multi orifice fuel injection nozzle is centered with respect to the cavity; the improvement characterized in that: the cavity is defined by a bottom wall and an inner side wall means, said side wall means comprising a number of flat wall and circular wall portions and being of polygonal shape in perpendicular section to the vertical axis of the piston throughout the vertical extent of said cavity, said fuel injection nozzle has a number of orifices corresponding to the number of flat wall portions, and the cavity inner side wall means is inclined inwardly and upwardly relative to the piston axis, and the nozzle openings being such that the multiple injection fuel jets are directed obliquely toward respectively side wall flat portions in the horizontal plane to cause the fuel mixture to be distributed towards the downstream side of said swirl after impinging said inner side wall means.

2. The combustion chamber of claim 1, wherein said inner side wall means inclination angle is between 3° and 25°.

* * * * *